(12) United States Patent
Molnar

(10) Patent No.: US 9,141,445 B2
(45) Date of Patent: Sep. 22, 2015

(54) ASYNCHRONOUS SYSTEM CALLS

(75) Inventor: Ingo Molnar, Grünheide-Kagel (DE)

(73) Assignee: Red Hat, Inc., Raleigh, NC (US)

( * ) Notice: Subject to any disclaimer, the term of this patent is extended or adjusted under 35 U.S.C. 154(b) by 1217 days.

(21) Appl. No.: 12/023,329

(22) Filed: Jan. 31, 2008

(65) Prior Publication Data

US 2009/0199202 A1   Aug. 6, 2009

(51) Int. Cl.
*G06F 9/46* (2006.01)
*G06F 9/54* (2006.01)
*G06F 9/44* (2006.01)

(52) U.S. Cl.
CPC .............. *G06F 9/545* (2013.01); *G06F 9/4426* (2013.01)

(58) Field of Classification Search
None
See application file for complete search history.

(56) References Cited

U.S. PATENT DOCUMENTS

| | | | |
|---|---|---|---|
| 5,175,679 A * | 12/1992 | Allen et al. ................... 700/28 |
| 5,787,231 A * | 7/1998 | Johnson et al. ............... 704/260 |
| 6,711,644 B1 * | 3/2004 | Accapadi et al. ............. 710/263 |
| 6,732,138 B1 * | 5/2004 | Browning et al. ............ 718/102 |
| 6,850,962 B1 * | 2/2005 | Povolny et al. ............... 709/203 |
| 7,539,991 B2 * | 5/2009 | Leong et al. .................. 718/102 |
| 7,870,560 B2 * | 1/2011 | Fong et al. .................... 719/313 |
| 2002/0174405 A1 * | 11/2002 | Janssen ............................. 716/3 |
| 2004/0068725 A1 * | 4/2004 | Mathiske et al. ............... 718/1 |
| 2005/0066149 A1 * | 3/2005 | Kanade ............................. 712/1 |
| 2005/0066332 A1 * | 3/2005 | Durai ............................. 718/108 |
| 2006/0123245 A1 * | 6/2006 | Avidan et al. ................. 713/189 |

OTHER PUBLICATIONS

Brown; "Asynchronous System Calls"; Jun. 27-30, 2007; Linux Symposium; 12 pages.*

* cited by examiner

*Primary Examiner* — H S Sough
*Assistant Examiner* — Umut Onat
(74) *Attorney, Agent, or Firm* — Lowenstein Sandler LLP

(57) ABSTRACT

Embodiments relate generally to a method of managing asynchronous system calls. The method includes instantiating an asynchronous data structure in a user space and passing the asynchronous data structure to the kernel for execution as an asynchronous system call. The method also includes executing the asynchronous system call in the kernel and returning the kernel to the space in response to the asynchronous system call being blocked on a thread. The method further includes returning a result of the asynchronous system call on the thread in the user space in response to the asynchronous system call being completed.

15 Claims, 3 Drawing Sheets

ASYNCHRONOUS SYSTEM CALLS

FIELD

This invention relates generally to asynchronous system calls, more particularly to systems and method for an asynchronous system call interface and execution thereof.

DESCRIPTION OF THE RELATED ART

The Linux kernel currently provides for a system call interface for asynchronous input/output ("AIO"). AIO can provide a path to better system resource utilization by letting a single process do independent work in parallel.

As a simplistic example, the calculation of a cryptographic hash of a very large file typically involves reading the file into pieces into memory and each piece is then hashed. With synchronous read ( ) calls, the central processing unit (CPU) can be idle while each piece is read from the file. Subsequently, as the CPU hashes the pieces in memory, the disk is idle. Making an assumption that the it takes the same amount of time to read piece as it takes to calculate its hash, the system is only working at half capacity. However, if AIO is used, the process can be fully utilize the CPU and disk by letting the disk issue the read for the next piece without blocking the CPU.

Although AIO can provide great benefits, it is not without disadvantages and drawbacks. For example, the current implementation of AIO supports few operations and only provides asynchronous submission and completion of those operations in limited circumstances. The current AIO implementation has only succeeded in providing cache-avoiding reads and writes to regular files, used almost exclusively by database software. The maintenance burden for so little functionality has proved to be disproportionately difficult which has also discouraged adding support for other operations.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
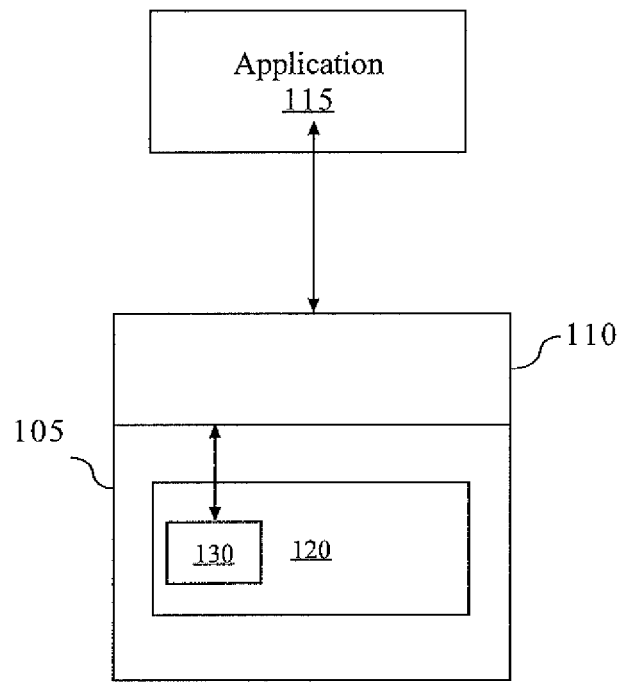
FIG. 1 illustrates an exemplary architecture of an embodiment of the invention.

For simplicity and illustrative purposes, the principles of the present invention are described by referring mainly to exemplary embodiments thereof. However, one of ordinary skill in the art would readily recognize that the same principles are equally applicable to, and can be implemented in, all types of operating systems that execute multiple applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for a generic system call interface for performing asynchronous operations. More particularly, the generic system call interface includes a syslet atom data structure that includes a number of fields: number of the system call, pointer to the arguments, a return pointer for the final status from the submitted call, a private field, a next field which points to the next syslet to be run by the kernel, and a flag field which controls how the syslets are executed.

With the syslet atom data structure filled in user space, an application (e.g., database, cryptographic program, etc.) can execute the asynchronous system call by executing an asynchronous system call such as "long async_exec (struct syslet_uatom*atom)". The kernel can then begin executing immediately. If the executed call executes without being blocked, the address of the syslet atom data structure indicate complete execution through a return value. Otherwise, the kernel can be configured to grab a thread from a kernel thread pool and use the selected thread to return to user space, and the called asynchronous system call continues with the original thread. In some embodiments, the selected thread can be used for syslet execution. Accordingly, the application can then be free to continue executing as it makes sense such as running more syslet atom data structures while the system call runs to completion.

With the generic system call interface, an application can register a ring buffer with the kernel using yet another function call such as an "async_register( )". When a syslet atom completes, the completed syslet atom's address can be stored in the next available empty buffer entry. Accordingly, the application can then use that address to find the associated system call status. The kernel can be configured not to overwrite any non-NULL ring buffer entries so the application must reset them as it releases them. If an application needs to wait for a completion of syslet atom data structure, the application can execute a wait function such as "long async_wait (unsigned long min_events)") as long as this interface is relative to a "measurement" in some embodiments. This function call can block the process until at least a minimum number of events ("min_events") have been stored into the ring buffer.

FIG. 1 illustrates an exemplary environment 100 that supports the generic system call interface in accordance with an embodiment. It should be readily apparent to those of ordinary skill in the art that the software environment 100 depicted in FIG. 1 represents a generalized schematic illustration and that other components may be added or existing components may be removed or modified.

As shown in FIG. 1, the software environment 100 can include an operating system 105. The operating system 105 can be a version of a Linux™, UNIX™, Windows™, or similar multi-tasking operating system. A run-time environment 110 can be configured to execute on the operating system 105 and represent a user-space. The run-time environment 110 can provide a set of software that supports the execution of applications/programs such as application 115. The run-time environment 110 can include an application program interface ("API", not shown) and a complementary API (not shown) within the application 115. The API can be configured to provide a set of routines that the application 115 uses to request lower-level services performed by the operating system 105. The operating system 105 can include a kernel 120. The kernel 120 may be configured to provide secure access to the underlying hardware of a processor.

The kernel 120 can include a syslet interface module 130. The syslet interface 130 can be configured to provide a user to access asynchronous system calls executed by the kernel 120 for applications, processes, jobs, tasks, threads, etc. The syslet interface 130 can couple with a syslet atom data structure that includes a number of fields: number of the system call, pointer to the arguments, a return pointer for the final status from the submitted call, a private field, a next field which points to the next syslet to be run by the kernel, and a flag field which controls how the syslets are executed.

With the syslet atom data structure filled in user space, application 115 (e.g., database, cryptographic program, etc.) can execute the asynchronous system call by executing an asynchronous system call such as "long async_exec (struct syslet_uatom*atom)". The kernel 120 can then begin executing immediately. If the embedded systems calls execute without being blocked, a positive response from the syslet atom data structure will be returned. Otherwise, the kernel 120 can be configured to grab a thread from a thread pool and use the selected thread to return to user space, and the called asynchronous system call continues with the original thread or continue on with a new syslet. Accordingly, the application 115 can then be free to execute as it makes sense such as running more syslet atom data structures while the system call runs to completion.

With the syslet interface module 130, an application 115 can register a ring buffer with the kernel 120 using yet another function call such as an "async_register( )". When a syslet atom data structure completes, the completed syslet atom's address can be stored in the next available empty buffer entry. Accordingly, the application 115 can then use that address to find the associated system call status. The kernel 120 can be configured not to overwrite any non-NULL ring buffer entries so the application must reset them as it releases them.

If an application 115 needs to wait for a completion of syslet atom data structure, the application 115 can execute a wait function such as "long async_wait (unsigned long min_events)" in some embodiments. This function call can block the process until at least a minimum number of events ("min_events") have been stored into the ring buffer.

Figure 2:
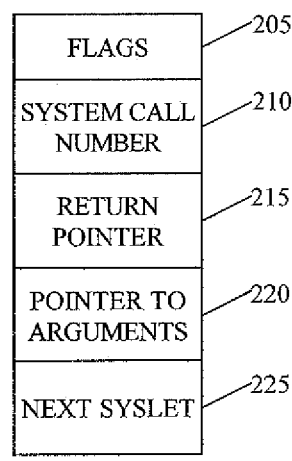
FIG. 2 depicts an exemplary data structure in accordance with various embodiments.

FIG. 2 depicts an exemplary syslet atom data structure 200 used by the syslet interface module 130. It should be readily apparent to those of ordinary skill in the art that the diagram 200 depicted in FIG. 2 represents a generalized schematic illustration and that other steps may be added or existing steps may be removed or modified.

As shown in FIG. 2, the syslet atom data structure 200 can comprise a flags field 205, a system call number field 210, a return pointer field 215, a pointer to arguments field 220, and a next syslet field 225. The flag field 205 can be set a number of flags, which can control how the syslets atoms are executed. In some embodiments, the flags can be a SYSLET_STOP_ON_NONZERO flag, a SYSLET_STOP_ON_ZERO flag, a SYSLET_STOP_ON_NEGATIVE flag, a SYSLET_STOP_ON_POSITIVE flag, and a SYSLET_SKIP_TO_NEXT_ON flag. The SYSLET_STOP_ON_NONZERO flag can be configured to stop a syslet atom execution in response to a nonzero return value of one of the embedded system call. The SYSLET_STOP_ON_ZERO flag can be configured to stop a syslet atom execution in response to a return of a zero return value of the embedded system call. The SYSLET_STOP_ON_NEGATIVE flag can be configured to stop a syslet atom execution in response to negative return value of the embedded system call. The SYSLET_STOP_ON_POSITIVE flag can be configured to stop a syslet atom execution in response to return of a positive return value of the embedded system call. The SYSLET_SKIP_TO_NEXT_ON flag can be configured to indicate to the kernel 120 to skip a syslet atom in response to a return value of next on flag being set.

In some embodiments, a SYSLET_SYNC flag can be set in the flags field 205. Accordingly, some implementations using syslet atoms can execute these embedded system calls in parallel unless explicitly or implicitly prevented.

The system call number field 210 can indicate the number of the system call to run when set with a value. The return pointer field 215 can indicate to the kernel 120 where to put the final status from the executed asynchronous call when set with a value. The pointer to arguments field 220 can indicate a pointer to the arguments of the syslet atom when set with a value. The next syslet field 225 can indicate the user address of the next syslet to be executed when set with a value. Accordingly, an application 115 is not restricted to running individual asynchronous system calls and can chain a series of syslets.

Figure 3:
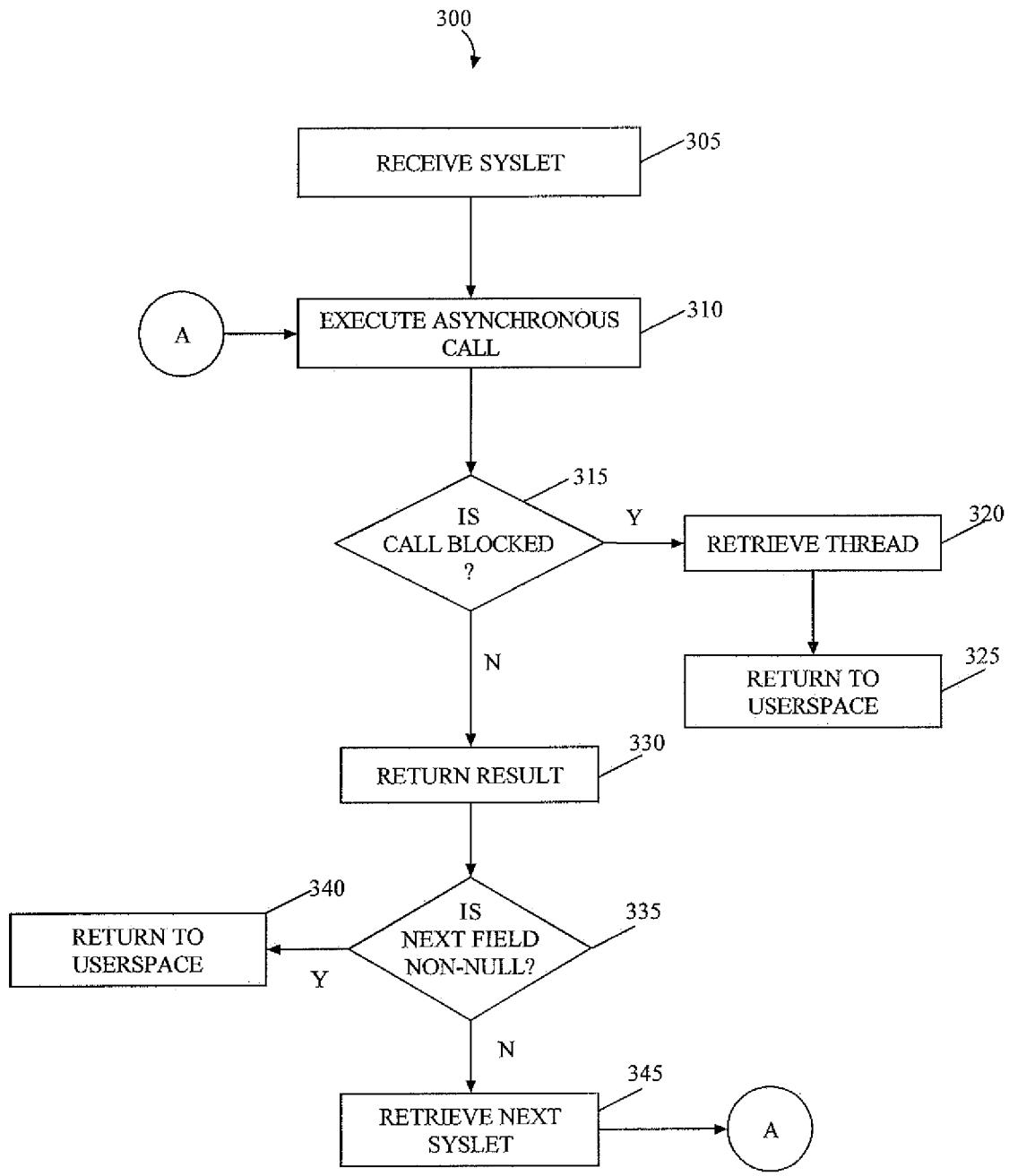
FIG. 3 shows an exemplary flow diagram in accordance with various embodiments.

FIG. 3 illustrates an exemplary flow diagram 300 implemented by the syslet interface module 130. It should be readily apparent to those of ordinary skill in the art that the flow diagram 300 depicted in FIG. 3 represents a generalized schematic illustration and that other steps may be added or existing steps may be removed or modified.

As shown in FIG. 3, an application 115, process, thread, etc. (or generally, process), can create a syslet atom data structure 200 with a selected set of values and execute the syslet by executing a function call such as "long async_exec (struct syslet_uatom*atom)", in step 305.

In step 310 the kernel 120 can be configured to execute the specified asynchronous call. If the kernel 120 is blocked, in step 315, the kernel 120 can be configured to retrieve another thread from a thread pool, in step 320. The kernel 120 can be configured to let the syslet atom execute on the original thread and return to user space on the second thread, in step 325. Subsequently, the kernel 120 can execute the next instruction of the program after returning to userspace.

Otherwise, the kernel 120 can return the result of the executed syslet, in step 330. The kernel 120 can write to the results to the location pointed by a value set in the return pointer field 215. Alternatively, the kernel 120 can write the results to a ring buffer instantiated by the application 115 by executing another function call such as "async_register( )".

In step 335, the kernel 120 can be configured to examine the value set in the next syslet field 225. If the value is non-null, the kernel 120 can be configured to execute the next syslet specified by the value in the next syslet field 225, in step 345. Subsequently, the kernel 120 can return to the processing associated with step 310. Otherwise, if the value is null in the next syslet field 225, the kernel 120 can return to user space to execute the next process, task, instruction, etc., in step 340.

Figure 4:
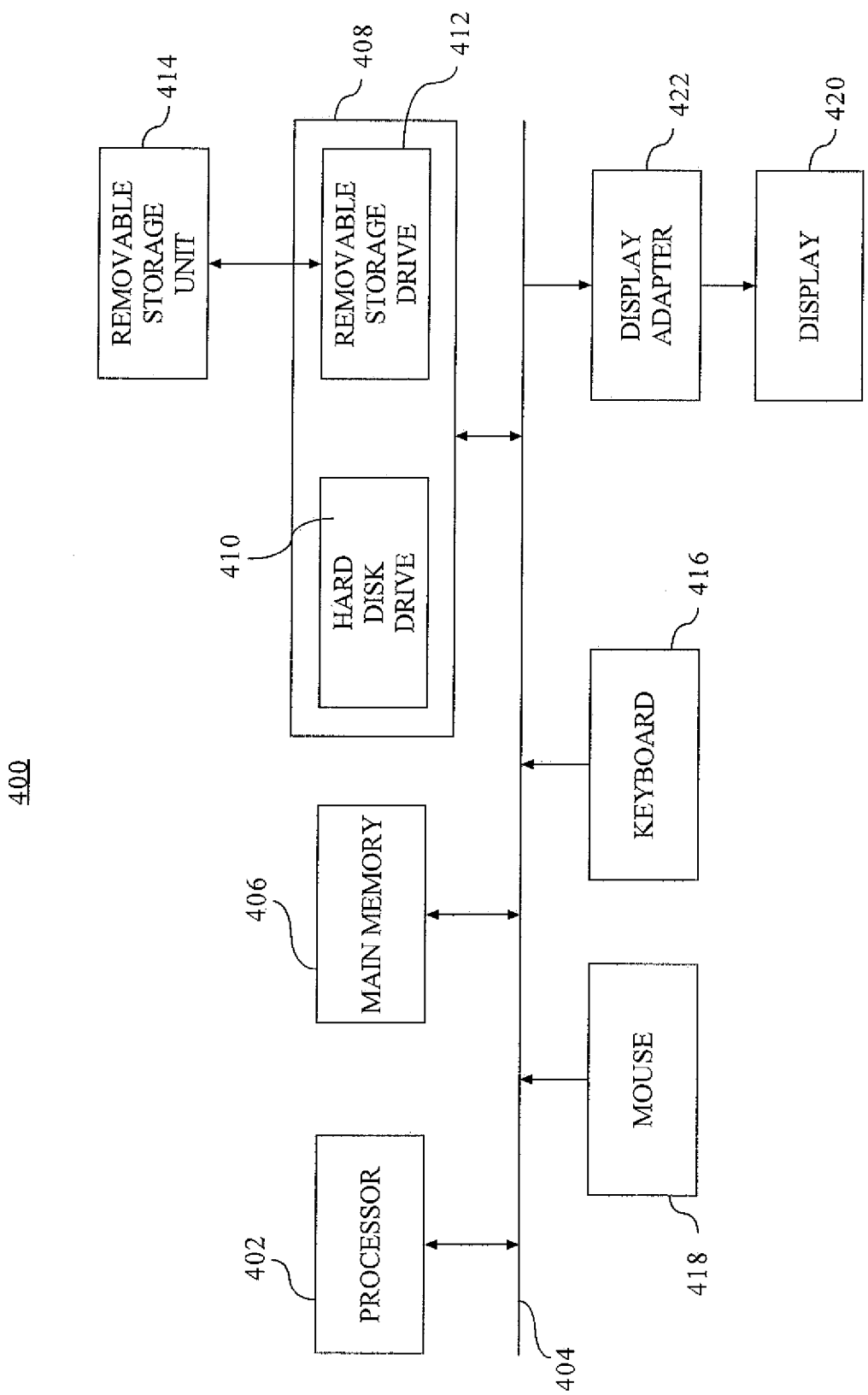
FIG. 4 illustrates an exemplary computing platform to execute the syslet module in accordance with various embodiments.

FIG. 4 illustrates an exemplary block diagram of a computing platform 400 where an embodiment of the syslet module 130 can be practiced. The functions of the embodiments of the present invention of the syslet module may be implemented in program code and executed by the computing platform 400. The syslet module can be implemented in computer languages such as PASCAL, C, C++, JAVA, etc.

As shown in FIG. 4, the computer system 400 includes one or more processors, such as processor 402 that provide an execution platform for embodiments of the syslet module. Commands and data from the processor 402 are communicated over a communication bus 404. The computer system 400 also includes a main memory 406, such as a Random Access Memory (RAM), where the syslet module can be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the syslet module can be stored. The removable storage drive 412 reads from and/or writes to a removable storage unit 414 in a well-known manner. A user interfaces with the optimal run-lime linker with a keyboard 416, a mouse 418, and a display 420. A display adapter 422 interfaces with the communication bus 404 and the display 420. The display adapter also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method performed by a processor, the method comprising:
    executing, by the processor, an application in a user space, wherein executing the application comprises:
    instantiating, by the processor, an asynchronous data structure in the user space,
    passing, by the processor, the asynchronous data structure to a kernel for execution as an asynchronous system call, wherein the asynchronous system call is independent of another asynchronous system call, and wherein the asynchronous data structure comprises: a number of the asynchronous system call, a field pointing to another asynchronous data structure, and a flag field;
    executing, by the processor, the asynchronous system call in the kernel using a first thread;
    retrieving, by the processor and in view of the asynchronous system call being blocked, a second thread with respect to the user space;
    continuing to execute, by the processor, the application in the user space using the second thread until a completion of the asynchronous system call while continuing to execute the asynchronous system call using the first thread;
    returning, by the processor, a result of the asynchronous system call on the first thread in response to the completion of the asynchronous system call;
    storing, by the processor, an address associated with the result of the asynchronous system call in a buffer;
    waiting, by the application, for the completion of the asynchronous data structure until at least a minimum number of events are stored in the buffer;
    determining, by the processor, a status of a next field in the asynchronous data structure;
    retrieving, by the processor, a value of the next field in response to the status of the next field being non-null; and
    executing, by the processor, a subsequent asynchronous system call with the value of the next field as an address in the user space.

2. The method of claim 1, further comprising:
    determining, by the processor, a status of the flag field in the asynchronous data structure; and
    stopping, by the processor, execution of the asynchronous system call in response to the status of the flag field being stop-on-nonzero.

3. The method of claim 1, further comprising:
    determining, by the processor, a status of the flag field in the asynchronous data structure; and
    stopping, by the processor, execution of the asynchronous system call in response to the status of the flag field being stop-on-zero.

4. The method of claim 1, further comprising:
    determining, by the processor, a status of the flag field in the asynchronous data structure; and
    skipping, by the processor, execution of the asynchronous system call to a next asynchronous system call in response to the status of the flag field being skip-to-next-on.

5. The method of claim 1, further comprising:
    determining, by the processor, a status of the flag field in the asynchronous data structure; and
    skipping, by the processor, execution of the asynchronous system call to a next asynchronous system call in response to the status of the flag field being skip-to-next-on.

6. A method performed by a processor, the method comprising:
    executing, by the processor, an application in a user space, wherein executing the application comprises:
    instantiating, by the processor, a syslet atom in the user space, and
    passing, by the processor, the syslet atom to a kernel for execution as an asynchronous system call, wherein the asynchronous system call is independent of another asynchronous system call, and wherein the syslet atom comprises: a number of the asynchronous system call, and a field pointing to another syslet atom;
    executing, by the processor, the asynchronous system call in the kernel using a first thread;

retrieving, by the processor and in view of the asynchronous system call being blocked, a second thread with respect to the user space;

continuing to execute, by the processor, the application in the user space using the second thread until a completion of the asynchronous system call while continuing to execute the asynchronous system call using the first thread;

returning, by the processor, a result of the asynchronous system call on the second thread in the user space in response to the completion of the asynchronous system call;

storing, by the processor, an address associated with the result of the asynchronous system call in a buffer;

waiting, by the application, for a completion of the syslet atom until at least a minimum number of events are stored in the buffer;

determining, by the processor, a status of a next field in the syslet atom;

retrieving, by the processor, a value of the next field in response the status of the next field being non-null; and executing, by the processor, a subsequent asynchronous system call with the value of the next field as an address in the user space.

7. The method of claim 6, further comprising:
determining, by the processor, a status of a flag field in the syslet atom; and
stopping, by the processor, execution of the asynchronous system call in response to the status of the flag field being stop-on-nonzero.

8. The method of claim 6, further comprising:
determining, by the processor, a status of a flag field in the syslet atom; and
stopping, by the processor, execution of the asynchronous system call in response to the status of the flag field being stop-on-zero.

9. The method of claim 6, further comprising:
determining, by the processor, a status of a flag field in the syslet atom; and
skipping, by the processor, execution of the asynchronous system call to a next asynchronous system call in response to the status of the flag field being skip-to-next-on.

10. The method of claim 6, further comprising:
determining, by the processor, a status of a flag field in the syslet atom; and
skipping, by the processor, execution of the asynchronous system call to a next asynchronous system call in response to the status of the flag field being skip-to-next-on.

11. A system comprising:
a memory to store a syslet data structure;
a software program; and
a processor, operatively coupled to the memory, to execute the software program to:
execute an application in a user space, wherein to execute the application is to:
instantiate the syslet data structure in the user space, and
pass the syslet data structure to a kernel for execution as an asynchronous system call, wherein the asynchronous system call is independent of another asynchronous system call, and wherein the syslet data structure comprises at least one of: a number of the asynchronous system call, a field pointing to another syslet data structure, or a flag field;
execute the asynchronous system call in the kernel using a first thread;
retrieve, in view of the asynchronous system call being blocked, a second thread with respect to the user space;
continue to execute the application in the user space with the second thread until a completion of the asynchronous system call while the asynchronous system call continues to execute with the first thread;
return a result of the asynchronous system call on the first thread in response to the completion of the asynchronous system call;
store an address associated with the result of the asynchronous system call in a buffer;
wait, by the application, for a completion of the syslet data structure until at least a minimum number of events are stored in the buffer;
determine a status of a next field in the syslet data structure;
retrieve a value of the next field in response the status of the next field being non-null; and
execute a subsequent asynchronous system call with the value of the next field as an address in the user space.

12. The system of claim 11, wherein the processor is further to: determine a status of the flag field in the syslet data structure; and
stop execution of the asynchronous system call in response to the status of the flag field being stop-on-nonzero.

13. The system of claim 11, wherein the processor is further to:
determine a status of the flag field in the asynchronous data structure; and
stop execution of the asynchronous system call in response to the status of the flag field being stop-on-zero.

14. The system of claim 11, wherein the processor is further to: determine a status of the flag field in the syslet data structure; and
skip execution of the asynchronous system call to a next asynchronous system call in response to the status of the flag field being skip-to-next-on.

15. The system of claim 11, wherein the processor is further to: determine a status of the flag field in the syslet data structure; and
skip execution of the asynchronous system call to a next asynchronous system call in response to the status of the flag field being skip-to-next-on.

* * * * *